US 12,114,719 B2

(12) United States Patent
Johnson

(10) Patent No.: US 12,114,719 B2
(45) Date of Patent: Oct. 15, 2024

(54) INTEGRATED HAIR WITH MAGNETIC SECURING DEVICE

(71) Applicant: FNLONGLOCKS, INC., Jacksonville, FL (US)

(72) Inventor: Shawna Johnson, Jacksonville, FL (US)

( * ) Notice: Subject to any disclaimer, the term of this patent is extended or adjusted under 35 U.S.C. 154(b) by 4 days.

(21) Appl. No.: 16/141,454

(22) Filed: Sep. 25, 2018

(65) Prior Publication Data

US 2019/0090567 A1    Mar. 28, 2019

Related U.S. Application Data

(60) Provisional application No. 62/562,903, filed on Sep. 25, 2017.

(51) Int. Cl.
*A41G 5/00* (2006.01)
*A01K 13/00* (2006.01)
*A45D 19/00* (2006.01)
*A45D 8/00* (2006.01)

(52) U.S. Cl.
CPC ............ *A41G 5/0073* (2013.01); *A01K 13/00* (2013.01); *A45D 19/0066* (2021.01); *A45D 8/004* (2021.01); *A45D 8/006* (2021.01)

(58) Field of Classification Search
CPC ...... A41G 5/00; A41G 5/0006; A41G 5/0013; A41G 5/0026; A41G 5/004; A41G 5/0046; A41G 5/0053; A41G 5/0073; A41G 5/02
See application file for complete search history.

(56) References Cited

U.S. PATENT DOCUMENTS

| | | | | |
|---|---|---|---|---|
| 5,722,434 A | * | 3/1998 | Walker | A41G 5/0073 132/201 |
| 5,890,498 A | * | 4/1999 | Kawaguchi | A41G 5/004 132/275 |
| 10,010,125 B1 | * | 7/2018 | Maman | A45D 8/24 |
| 2006/0162738 A1 | * | 7/2006 | Chudzik | A45D 8/24 132/278 |
| 2006/0169296 A1 | * | 8/2006 | Gill | A41G 5/004 132/53 |
| 2007/0006890 A1 | * | 1/2007 | Sthair | A41G 5/008 132/201 |
| 2008/0190442 A1 | * | 8/2008 | Kwak | A41G 5/0026 132/273 |
| 2009/0120451 A1 | * | 5/2009 | Kenna | A41G 5/008 132/201 |

(Continued)

FOREIGN PATENT DOCUMENTS

| | | | |
|---|---|---|---|
| CA | 2618233 | * | 9/2008 |
| CN | 106666900 | * | 1/2017 |
| GB | 2482131 | * | 1/2012 |

*Primary Examiner* — Rachel R Steitz
*Assistant Examiner* — Brianne E Kalach
(74) *Attorney, Agent, or Firm* — Joseph P. Kincart; Tracnik Law PLLC

(57) ABSTRACT

The present disclosure provides methods and apparatus for integration of hair extensions or other integrations into a user's natural hair. According to the present disclosure, an adhesive means, such as a magnet, Velcro, or snaps, is used to integrate hair extensions seamlessly with user hair. The magnetic nature of the adhesion allows for simple hair decorations, such as flowers, to be attached with minimal effort.

17 Claims, 7 Drawing Sheets

(56) References Cited

U.S. PATENT DOCUMENTS

| | | | |
|---|---|---|---|
| 2011/0061674 A1* | 3/2011 | Oeffinger | A44C 15/006 132/273 |
| 2016/0186924 A1* | 6/2016 | Tracey | F16B 2/10 248/206.2 |
| 2016/0206031 A1* | 7/2016 | Stoka | A41G 5/02 |
| 2018/0070664 A1* | 3/2018 | Hazan | A44B 17/0064 |

* cited by examiner

200A

200B

200C

INTEGRATED HAIR WITH MAGNETIC SECURING DEVICE

CROSS REFERENCE TO RELATED APPLICATIONS

The present application claims priority to Provisional Patent Application Ser. No. 62/562,903, filed Sep. 25, 2017, and entitled INTEGRATED HAIR WITH MAGNETIC SECURING DEVICE.

FIELD OF THE DISCLOSURE

The present disclosure relates to methods of securing hair integrations, such as hair extensions or supplemental hair inserts, with a magnetic attachment device.

BACKGROUND OF THE DISCLOSURE

Hair extensions are well known in the art. In general, a user with less hair attaches additional hair. The additional hair may have been provided to increase an overall length of a user's hair. Hair would be attached via a hair weave or via a spring clasp into existing hair.

A hair weave is human or artificial hair integrated with a user's natural hair. Weaving additional human or synthetic pieces can enhance one's hair by giving it volume, length and adding color without the damage of chemicals or adopting a different hair texture than that of their own.

Traditional methods of hair attachment required specialized skills, for example, hair is known to be braided in. Generally, individual locks of hair are tied to native hair, typically with the assistance of an upholstery thread. Tie ins are generally longer term hair integrations.

Hair is also known to be taped into the user's native hair. Tape in hair additions require tapes, glues, special shampoos and conditioners and glue remover to remove the hair integrations that have be applied with adhesives.

Additional forms of known attachment of a hair integration includes permanent attachment of integrated hair to a hair clip (barrette). The barrette attached integrated hair is limited in that it includes a predetermined contour and width of an insert. In addition, hair attached to a barrette includes a predetermined amount of hair at a predetermined length and color. Barrettes are often difficult to manage and essentially impossible to clasp with one hand. Pressure during installation, while the barrette is pressed against the scalp, is uncomfortable at best and may cause a small wound, especially on thinner skin such as skin of an older person who is also susceptible to hair loss.

Barrettes may also be uncomfortable do to one or more of: pinching, scalp abrasion and hair pulling.

Examples of some hair integration techniques includes Bonding which is a method of weaving that lasts for a short period of time in comparison to sew-in weaving. It involves the application of hair glue to a section of artificial hair then onto a person's natural hair; special hair adhesives are used in bonding to prevent damage to one's natural hair. This technique is commonly used and does not cause damage to the hair unless taken out without proper directions from a professional. It is advised that weave bonding be installed for up to 3 weeks because the glue begins to loosen up and lessens the attractiveness of the hair. There are 2 types of bonding methods: soft bond and hard bond. Soft bond is flexible and comfortable to wear and is made using latex/acrylic based adhesives. Hard bond is the industry term for bonding treatments whose adhesive contains cyanoacrylate, or super glue. Hard bond adhesives may last longer than a soft bond adhesive because it is not water based and therefore less susceptible to deterioration. Nonetheless, the hard bond adhesives are not comfortable because they are rigid. Such bond attachments generally last 4-6 weeks before a maintenance appointment is necessary.

This involves a machine similar to a hot glue gun used to attach human hair extensions to individual strands of one's natural hair of about ⅛ to ¼ inch squared sections for a truly authentic look. Another option for fusion attachments is using hair which is pre-tipped with a keratin adhesive. A heat clamp is then used to melt the adhesive to attach the extension hair to the natural hair. Fusion weave allows washing hair frequently and the use of regular hair products such as hair gels. This technique is very time consuming, taking 3 or more hours. They need re-positioning every 2-3 months as the natural hair grows. Due to various chemicals in the glue, which may cause hair loss and scalp irritation, combined with heat, this method is more damaging to natural hair.

Micro ring (also known as micro-bead or micro loop) hair extensions use small metal rings or beads (usually aluminum) and can sometimes be lined with silicone to attach the extension hair. They are fixed to small sections of natural hair and tightened using a special tool that clamps the bead around the natural hair.

The micro-beads are designed to be small enough so that they are not visible in normal use. They need re-positioning every two to three months as the natural hair grows and the micro-beads move away from the scalp. Multiple sizes of micro rings have been used. Typically bead size ranges from about 1.5-5.5 mm (0.059-0.217 in). The sizing makes a difference on the weight of the extensions, the feel, and the visibility. Some micro-beads are so tiny that they mimic a non-surgical hair transplant. The stylist installing the extensions should determine what size micro rings/beads are best for the user's hair length and texture, prior to installation on the head.

Netting is a technique which involves braiding natural tresses under a thin, breathable net that serves as a flat surface onto which stylists can weave extensions. This method requires the use of hair net or cap to be placed over the person's hair that has been braided.

Netting provides more flexibility than track placement because the stylist is not limited to sewing extensions to a braid. With netting there is the option of sewing the hair wefts onto the net or gluing. This technique is still time-consuming (although not as long as other hair techniques) and takes about two to four hours to complete, depending upon the user and the user's hair volume, length and frailty.

Weave extensions may include lace fronts, which are made from a nylon mesh material formed into a cap that is then hand-ventilated by knotting single strands of hair into the tiny openings of the cap, giving the hair a more natural and authentic continuity than typical extensions. It has few variations including straight, wavy and curly. Furthermore, the extension units can be woven in or attached to a person's hairline with special adhesives. To ensure a proper fit, head measurements are taken into account with this type of weave. A lace frontal is best placed by a professional since more advanced weaving and hair extensions are used. This method is commonly used because it makes it possible to have access to a certain part of their scalp.

Tracking is one of the most commonly used methods as it is relatively fast and lasts longer than some other techniques. However, it does not allow for regular hair maintenance. Tracking involves the braiding of a person's natural hair. In order to prevent the hair from being bumpy or uneven, the hair is sewn horizontally or vertically across the head from one side to the other starting from the bottom. The braided hair is then sewn down and the hair weft extensions are sewn onto the braids. A weave can consist of a few tracks, or the whole head can be braided for a full head weave. With a full head weave, the braids are sewn down or covered with a net. Extensions are then sewn to the braids. The number of tracks used depends on a desired look.

SUMMARY OF THE DISCLOSURE

Accordingly, the present invention provides methods and devices for attaching hair integrations, including hair extensions, with a magnetic fastener. The magnetic fastener allows for ease of installation of a hair integration piece. The magnetic hair integration is easily attached and removed without the need of special adhesives. It may be installed by someone with very little strength; is not damaging to skin on the scalp and in many cases may be attached with a single hand.

Aspects of various embodiments of the present invention include, but are not limited to: hair extensions removably installed and movably positioned, single hand installation and removal of hair extensions; ease of adjustment and position based upon style of hair and/or magnet strength; no weaving; no glue; minimal or no damage to existing hair; may be worn for a user determined length of time; comfort enhanced via ability to adjust to contour of head; no special equipment needed for installation, including no need for one or more of: heat guns, heat clamps; may include decorative aspects or minimalist styling and color; strength of magnet (i.e. via volume of magnetic material or force of attraction of magnetic material) determines size and/or amount of hair integration available; and easily repositionable.

In some embodiments, a first substrate with a portion including a first magnetic polarity is placed proximate to a user's natural hair. The placing also includes placing a second substrate with a portion including a second magnetic polarity proximate to the first substrate such that the first magnetic polarity and the second magnetic polarity attract the first substrate and the second substrate to each other, and the user's natural hair is bound between the first substrate and the second substrate. The placing also includes securing the hair integration to one or both of the first substrate and the second substrate.

Implementations may include one or more of the following features. The method may additionally include the step of forming a first substrate and a second substrate into a shape complementing a shape of a portion of a surface of a user's skull structure. One or both of the first substrate and the second substrate may include a decorative portion. The decorative portion may be colorful and/or of a design to attract attention. Alternatively, the decorative portion may be nondescript and blend with a user's natural hair. The substrate may form according to a shape of a sacral and a coccygeal vertebrae, and where the user is a horse.

One general aspect includes a method of securing a first hair integration, the method including the steps of: positioning a first hair integration at a desired location proximate to a user's natural hair, where the first hair integration includes hair fixedly attached to a flexible substrate and two or more pairs of magnetic portions are additionally attached to the flexible substrate, the magnetic portions including a first subportion and a second subportion, the first subportion and the second subportion including opposite magnetic polarity and positioned spatially distinct on the flexible substrate; positioning the user's natural hair between the first subportion and the second subportion; and securing the first hair integration in place by aligning the first subportion and the second subportion in a position proximate to each other such that the opposite magnetic polarities of the first subportion and the second subportion exert a binding force on the user's natural hair between the first subportion and the second subportion.

Implementations may include one or more of the following features. The method where the method further includes the step of: fixedly attaching a second hair integration between a successive pair of magnetic portions. The method where the second hair integration includes a different thickness than the first hair integration. The method where the second hair integration forms a portion of a predefined hairstyle. The method where the method further includes the step of: spraying one or more of: the first and second hair integrations with a colorant. The method where the first and second hair integrations are sprayed with colorants corresponding to different colors. The method where the different colors have similar hues. The method further including the steps of: removing the two subportions from magnetic proximity to each other and hanging the flexible substrate on a clasping hanger. The method where the flexible substrate further includes a decorative portion. The method where the desired location on the user includes adjoining portions of natural hair.

One general aspect includes a secured hair extension including: a flexible substrate, one or more hair integrations fixedly attached to the flexible substrate, and one or more pairs of adhesion means.

Implementations may include one or more of the following features. The secured hair extension where the pair of adhesion means includes two magnets of opposite polarization. The secured hair extension where the pair of adhesion means includes Velcro. The secured hair extension where the pair of adhesion means includes a snap and a hole for receiving the snap. The secured hair extension where the hair integrations are colorized to achieve a desired color. The secured hair extension where the secured hair extension includes more than one colorized hair extension, and where the more than one colorized hair extensions are different colors.

In some embodiments, a first substrate with a portion including a first magnetic polarity is placed proximate to a user's natural hair. The placing also includes placing a second substrate with a portion including a second magnetic polarity proximate to the first substrate such that the first magnetic polarity and the second magnetic polarity attract the first substrate and the second substrate to each other, and the user's natural hair is bound between the first substrate and the second substrate. The placing also includes securing the hair integration to one or both of the first substrate and the second substrate.

Implementations may include one or more of the following features. The method may additionally include the step of forming a first substrate and a second substrate into a shape complementing a shape of a portion of a surface of a user's skull structure. One or both of the first substrate and the second substrate may include a decorative portion. The decorative portion may be colorful and/or of a design to attract attention. Alternatively, the decorative portion may be nondescript and blend with a user's natural hair. The substrate may form according to a shape of a sacral and a coccygeal vertebrae, and where the user is a horse.

One general aspect includes a method of securing a first hair integration, the method including the steps of: positioning a first hair integration at a desired location proximate to a user's natural hair, where the first hair integration includes hair fixedly attached to a flexible substrate and two or more pairs of magnetic portions are additionally attached to the flexible substrate, the magnetic portions including a first subportion and a second subportion, the first subportion and the second subportion including opposite magnetic polarity and positioned spatially distinct on the flexible substrate; positioning the user's natural hair between the first subportion and the second subportion; and securing the first hair integration in place by aligning the first subportion and the second subportion in a position proximate to each other such that the opposite magnetic polarities of the first subportion and the second subportion exert a binding force on the user's natural hair between the first subportion and the second subportion.

Implementations may include one or more of the following features. The method where the method further includes the step of: fixedly attaching a second hair integration between a successive pair of magnetic portions. The method where the second hair integration includes a different thickness than the first hair integration. The method where the second hair integration forms a portion of a predefined hairstyle. The method where the method further includes the step of: spraying one or more of: the first and second hair integrations with a colorant. The method where the first and second hair integrations are sprayed with colorants corresponding to different colors. The method where the different colors have similar hues. The method further including the steps of: removing the two subportions from magnetic proximity to each other and hanging the flexible substrate on a clasping hanger. The method where the flexible substrate further includes a decorative portion. The method where the desired location on the user includes adjoining portions of natural hair.

One general aspect includes a secured hair extension including: a flexible substrate, one or more hair integrations fixedly attached to the flexible substrate, and one or more pairs of adhesion means.

Implementations may include one or more of the following features. The secured hair extension where the pair of adhesion means includes two magnets of opposite polarization. The secured hair extension where the pair of adhesion means includes Velcro. The secured hair extension where the pair of adhesion means includes a snap and a hole for receiving the snap. The secured hair extension where the hair integrations are colorized to achieve a desired color. The secured hair extension where the secured hair extension includes more than one colorized hair extension, and where the more than one colorized hair extensions are different colors.

The details of one or more examples of the invention are set forth in the accompanying drawings and the description below. The accompanying drawings that are incorporated in and constitute a part of this specification illustrate several examples of the invention and, together with the description, serve to explain the principles of the invention: other features, objects, and advantages of the invention will be apparent from the description, drawings, and claims herein.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

The present disclosure provides generally for hair integration. According to the present disclosure, hair integration is accomplished via an easily inserted and removable magnetic securing device. The magnetic securing device may include a front side and a back side and have integrated hair attached to one or both of the front side and the back side. In addition, the magnetic securing device may be decorative in nature or be designed to be concealed behind the integrated hair. Hair integration may include hair extensions and/or integrations to improve fullness. Hair integrations may be a same or various colors and shades.

In the following sections, detailed descriptions of examples and methods of the disclosure are given. The description of both preferred and alternative examples though thorough are exemplary only, and it is understood that to those skilled in the art that variations, modifications, and alterations may be apparent. It is therefore to be understood that the examples do not limit the broadness of the aspects of the underlying disclosure as defined by the claims.

Figure 1:
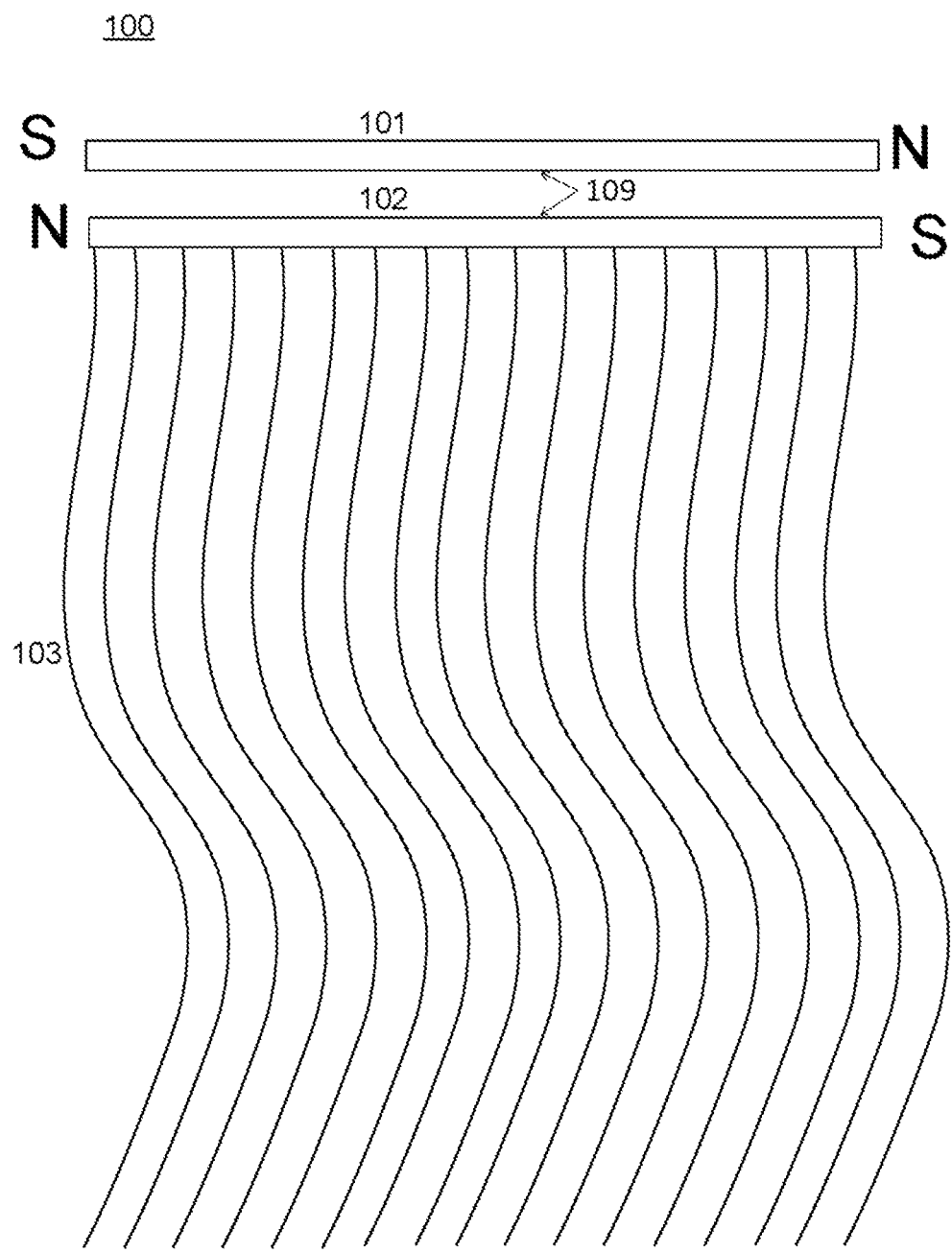
FIG. 1 illustrates exemplary hair integration with magnetic securing device.

Referring now to FIG. 1, a hair integration system 100 is illustrated with magnetic securing devices 101-102. A first magnetic securing device ("MSD") 101 may be positioned behind a user's natural hair (not shown) and be magnetically bound to a second magnetic securing device 102 in front of at least some of the user's hair such that the first MSD 101 and the second MSD 102 form a clasp with user hair in between the first MSD 101 and the second MSD 102. The first MSD 101 and the second MSD 102 become magnetically bound by aligning portions of the first MSD 101 that includes a first magnetic polarity with a portion of the second MSD 102 that includes a second magnetic polarity. Integrated hair 103 may be natural or artificial hair. The integrated hair may be fixedly attached to one or both of the first MSD 101 and the second MSD 102. Attachment of integrated hair to the first MSD 101 and/or the second MSD 102 may be accomplished for example, via one or more of: an adhesive bond, a mechanical fixation, and molding into a portion of the first MSD 101 and/or the second MSD 102.

Integrated hair 103 may include one or more of: natural hair from a hair donor; artificial hair; a user's own natural hair previously removed from the user; or other source of hair, such as hair grown in a laboratory or hair from an animal.

A magnetic binding of the first MSD 101 and the second MSD 102 may be accomplished by aligning a portion of the first MSD 101 with a first polarity in proximity to a portion of the second MSD 102 with a second polarity. The proximity of the opposite magnetic poles will cause the first MSD 101 and the second MSD 102 to be attracted to each other in a fixated position and thereby bind hair positioned between the first MSD 101 and the second MSD 102.

In some embodiments, one or both of the first MSD 101 and the second MSD 102 may be approximately 20 mm long by 3 mm wide by 1 mm thick in size. Other sizes are also within the scope of this invention. In some embodiments, one or both of the first MSD 101 and the second MSD 102 may have a grip stop or a non-slip liner 109 on their interiors. A non slip liner may include a pliable material such as silicon, nylon, polyvinylchloride, or other soft material with a surface with a more gripping quality than a metallic magnetic. In addition, the first and/or the second MSD may include a sheath or other cover in one or more different colors, textures and decorative fashions.

In another aspect, in some embodiments, the first MSD 101 may be nested within the second MSD 102 thereby improving alignment and/or profile thickness.

In other embodiments, the first MSD 101 and the second MSD 102 may comprise an alternative adhesion means besides magnets, such as Velcro or snaps.

Figure 2A:
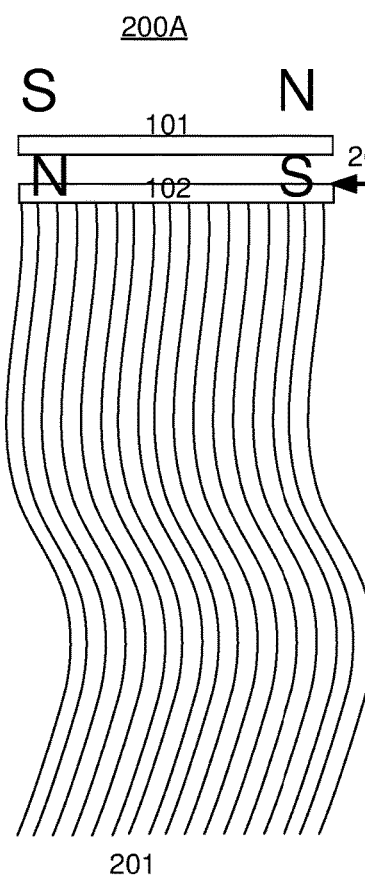
FIGS. 2A-2C illustrates exemplary multi-part hair integration with a magnetic securing device.
Figure 2B:
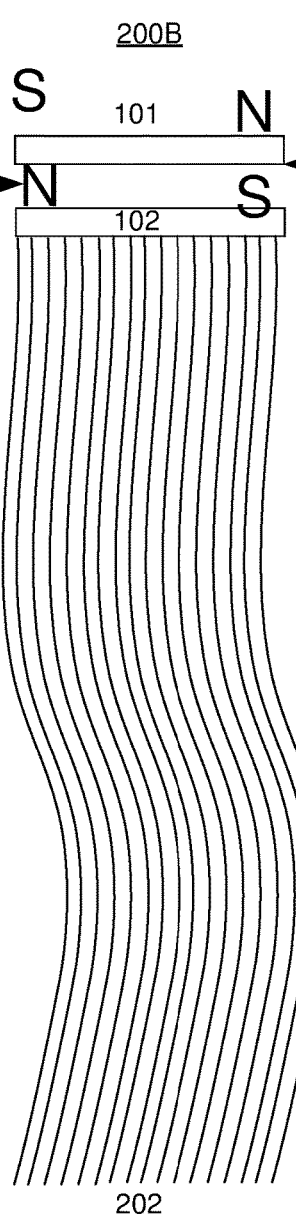
Figure 2C:
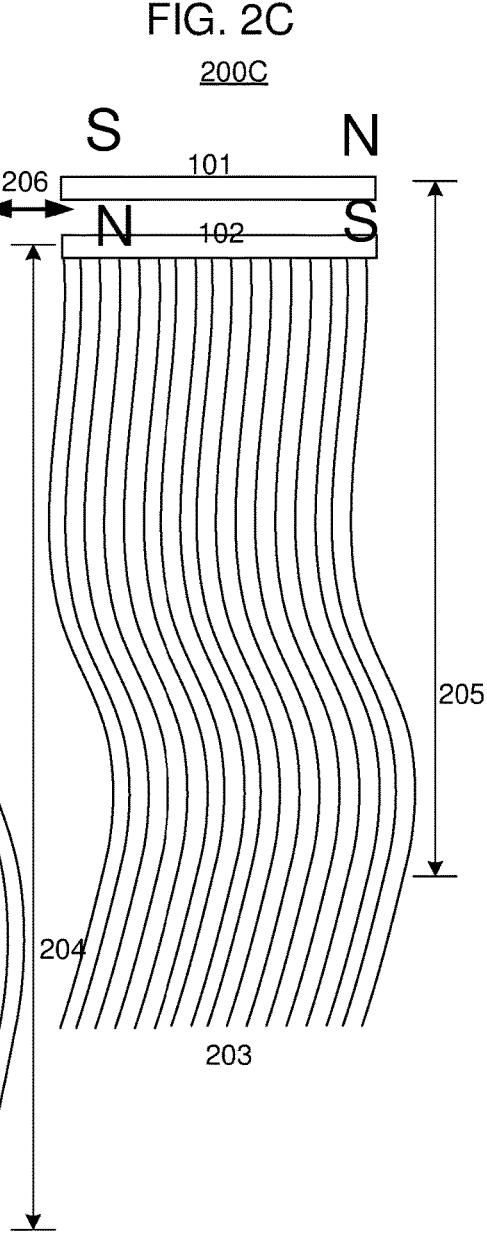
Figure 3A:
FIGS. 3A-3D illustrates exemplary embodiments of magnetic securing devices.
Figure 3A:
Figure 3C:
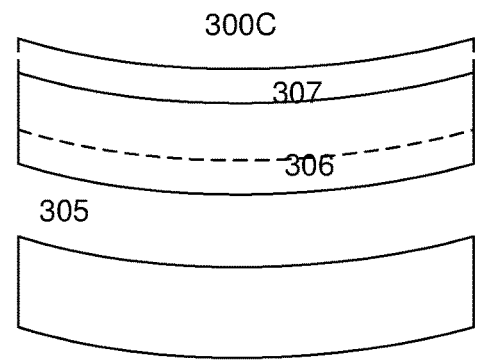
Figure 3B:
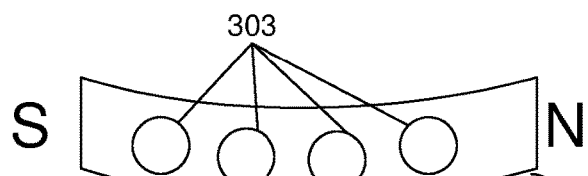
Figure 3D:
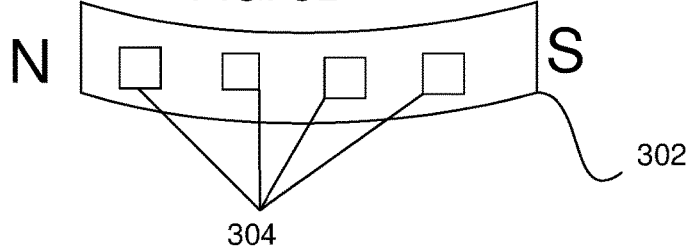
Figure 3D:
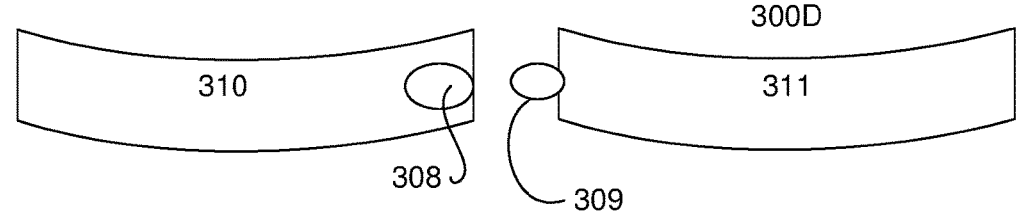

Referring now to FIGS. 2A-2C, multiple hair integration systems 200A-C are illustrated. The multiple hair integration systems 200A-C are include MSD's with respective attached hair different respective lengths. Accordingly, hair integration systems 200A-C may be a same or different length than adjacent. Interfaces on MSD's 101A-C to 102A-C with disparate magnetic polarity, such as North polarity 206 and South polarity 207 may cause two or more integration systems 200A-C to include MSD's 101A-102A, 101D-101C, 101B and 102C to align and remain fixedly attached via magnetic interaction.

Multiple integration systems 200A-C with different lengths 204 of integrated hair 201-203 may be removably attached via magnetic attraction to form a layered hair style or other style. In some embodiments, a different relative height of attachment to the user's head may result in a uniform bottom length of hair of the integrated hair, or a different relative height of attachment to the user's head may result in a layered or other uneven lower hair line.

Referring now to FIGS. 3A-3D, various physical shapes of hair integration systems 300A-C are illustrated. The shapes may include irregular design of a top down view wherein the various shapes aid with integration with a user's natural hair. In addition, the hair integration systems 300A-C may be planar, or may be arcuate. An arcuate shaped hair integration system 300A may be shaped to generally conform to a shape of a user's head.

In other embodiments, a hair integration system 300B may include a substrate 301-302 that is one or both of flexible and formable. A flexible substrate 301-302 may be flexed to conform to a shape of a user's head as pressure is applied to it, such as, for example by wearing a hat. In some embodiments, the flexible substrate may return to its native shape when pressure is relieved. In other embodiments, a flexible substrate may maintain a formal shape until acted upon by a subsequent forming shape.

A formable substrate may retain a shape that it is formed into via an initial application of pressure until acted upon with a subsequent pressure to reform it. Some formable and/or flexible substrates may have multiple smaller magnets 303-304 fixedly attached to the substrate such flexing and/or forming of the substrate does not crack the individual magnets. Multiple smaller magnets as compared to a size of an MSD allows for use of relatively brittle material for the magnets 303-304.

In some additional aspects, magnets may include different shapes, 303 and 304 in order for a user to differentiate between magnet types that will be attracted to one another or repel each other. In some embodiments, certain hair integration systems 300A-C may be arranged to repel nearby and/or adjacent hair integration systems 300A-C. In this manner, hair integrations will be prevented from bunching together.

In still another aspect, some hair integration systems 300C may include one or more substrates 305 with multiple layers 306-307. The various layers may include a decorative layer, a comfort layer and the like.

Still other aspects include substrates 310-311 with interlocking aspects 308-309. The interlocking aspects may include a cutout portion 308 for receiving a protrusion portion 309 and fix a first substrate 310 in a position relative to a second substrate 311 while the protrusion 309 is inserted into the cutout 308. In this manner, multiple substrates may be fixedly aligned to one another. Additional aspects allow a various sizes and shapes of substrates to be combined.

Figure 4:
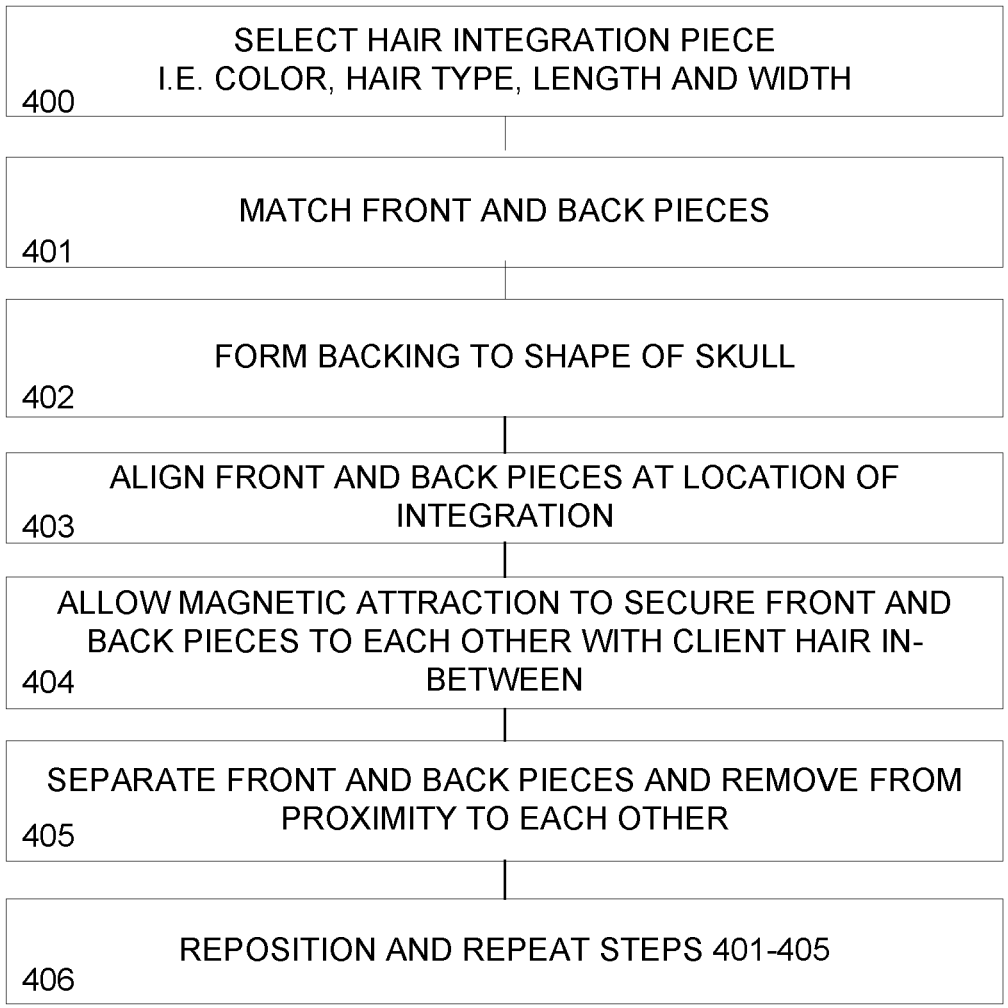
FIG. 4 illustrates exemplary method steps for practicing aspects of the present invention.

Referring now to FIG. 4, method steps for implementing embodiments of the present invention are presented. At method step 400, a hair integration piece is selected. The selection is based on one or more of: the color of the hair, the hair type, hair length, and hair width. In some embodiments, multiple hair integration pieces may be selected to create a desirable pattern or combination of hair.

At method step 401, front and back MSD pieces are matched. At method step 402, a backing is formed based on the shape of the bone structure of the user to whom the two MSDs will be attached. By way of non-limiting example, the user may be one of: a human, a pet, or a horse. By way of non-limiting example, the bone structure may be: a skull or other bone structure, such as the sacral or coccygeal vertebrae, such as for designing hair extensions for horse tails. The backing may be flush with the skeletal structure, or may be designed to have a portion hanging off the skeletal structure.

At method step 403, the front and back MSD pieces are aligned at the location of hair integration. At method step 404, the magnetic portions of the MSD secure the front and back MSD pieces to each other with user hair in between the pieces. At method step 405, the front and back MSD pieces are separated, leaving only the magnetic portions of the MSD pieces and the integrated hair. At method step 406, the process can be repeated by repositioning other MSDs and adding additional hair integration pieces.

Figure 5:
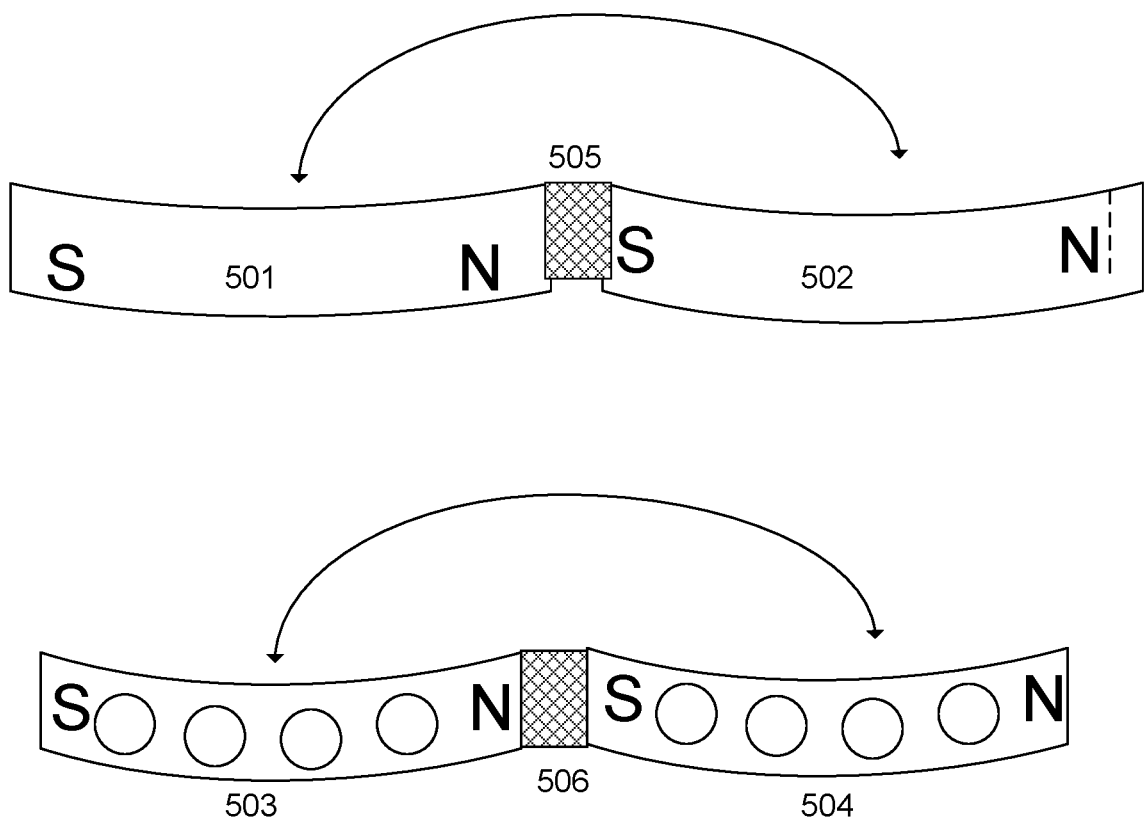
FIG. 5 illustrates exemplary single-part hair integration magnetic securing device.

Referring now to FIG. 5, in some implementations conducive to single hand insertion and removal, two or more substrates may be hingedly attached such that a user's hair may be placed between the substrates 501-504. Some substrates 501 may be shaped to match to a second substrate 502 such that the substrates will nest within each other when a flexible hinge material 505 is folded over.

Other embodiments, flexible substrates 503-504 may be joined by a foldable hinge material 506. Other combinations of substrates 501-504 and hinge materials 505-506 are also within the scope of the present invention.

Figure 6A:
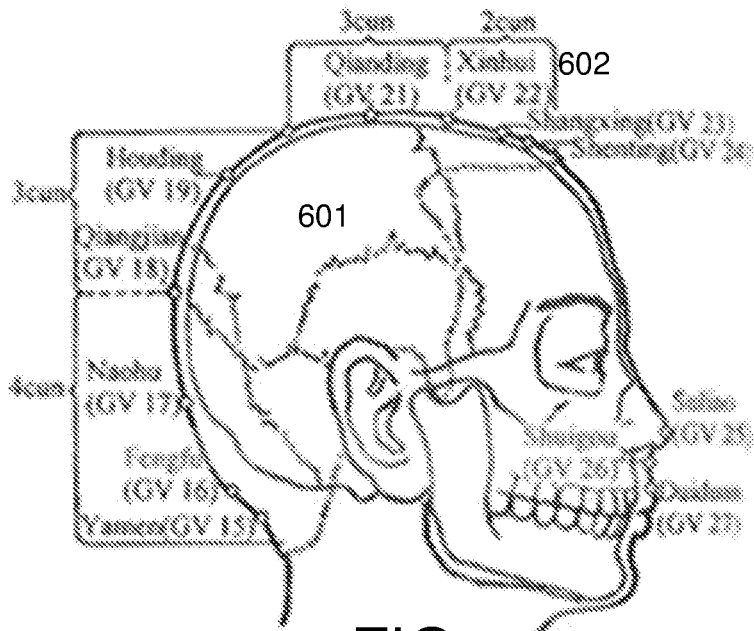
FIGS. 6A-6B illustrates exemplary placement of magnets at various points proximate to the user's body.
Figure 6B:
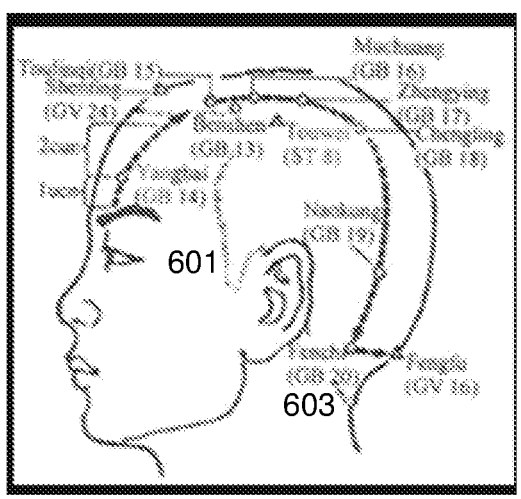

Referring now to FIGS. 6A-6B, although the present invention has generally been presented according to the aesthetic features of hair integrations and hair extensions, additional aspects of the present invention allow for placements of magnets at various points proximate to the user's body and in particular the region including the human head, shoulders and back. The placement of magnetic fields proximate to some areas of the skull 601 may provide a beneficial affect based upon physiological and/or magnetic energy field influences.

As illustrated, magnets may be affixed to a user's hair in such a manner as to place the magnets proximate to acupuncture and/or acupressure points deemed beneficial to treatment. The magnets may thereby provide a magnetic field to the locations indicated as pints for pressure and/or needles.

Whereas an acupuncture treatment generally inserts tiny needles into known points of a user's body, the present invention allows for positioning of magnets proximate to similar positions. The points may include locations on a user's head. According to the present invention, magnets are placed in positions commonly associated with acupuncture/acupressure treatment instead of, or in addition to needles and pressure. The magnets of the present invention may are applied for various reasons, including for example, one or more of: pain relief; generation of a calming feeling throughout the whole body; increased alertness and mental and physical performance.

One of the most common points at the very top of a head may be referred to as Baihui or DU 20 item 602. It is literally translated as "the meeting of the hundreds." It means a place where all the energies of our body converge and meet. It is a very powerful point and is used for many purposes. A magnetic force placed in position on this point may be associated with calming effect. If your pulse feels wiry or tense, acupuncturests usually will select it this point for needle insertion, a magnet may be self-administered by almost anyone and does not require a trip to the acupuncturest's office. DU20 602 and other positions may assist in relief of symptoms associates with one or more of: stress or tension; depression and/or anxiety; and irregular sleep patterns.

The DU20 point may also be substituted with another meeting point of Yang energy on a user, or other point with an increased energy level thereby causing better mental focus and relaxation at the same time. A point may be selected for chronic fatigue, lethargy, and poor mental focus and memory. A point may also be used to strengthen endocrine functions. Therefore, a point may be chosen based upon hypothyroidism, hormone weakness, and adrenal insufficiencies. As one of the highest points of the body, DU 20 may be chosen as a master point of endocrine glands and nervous system.

Another point is behind a user's neck, called Fengchi 603 GB20. It is literally translated as "the Pond of Wind." It is another powerful point that may be chosen for many purposes. Foremost, it may be chosen for headaches and neck pains. It may be chosen as a point that carries physical tension of the body. When a user's body is under siege, fighting sickness such as a common cold, this point can become tender and achy upon touch. It is also a very good point for regulating blood pressure and blood circulation. Other points are also within the scope of the present invention, some of which are specifically designated in FIGS. 6A-6B.

Figure 7:
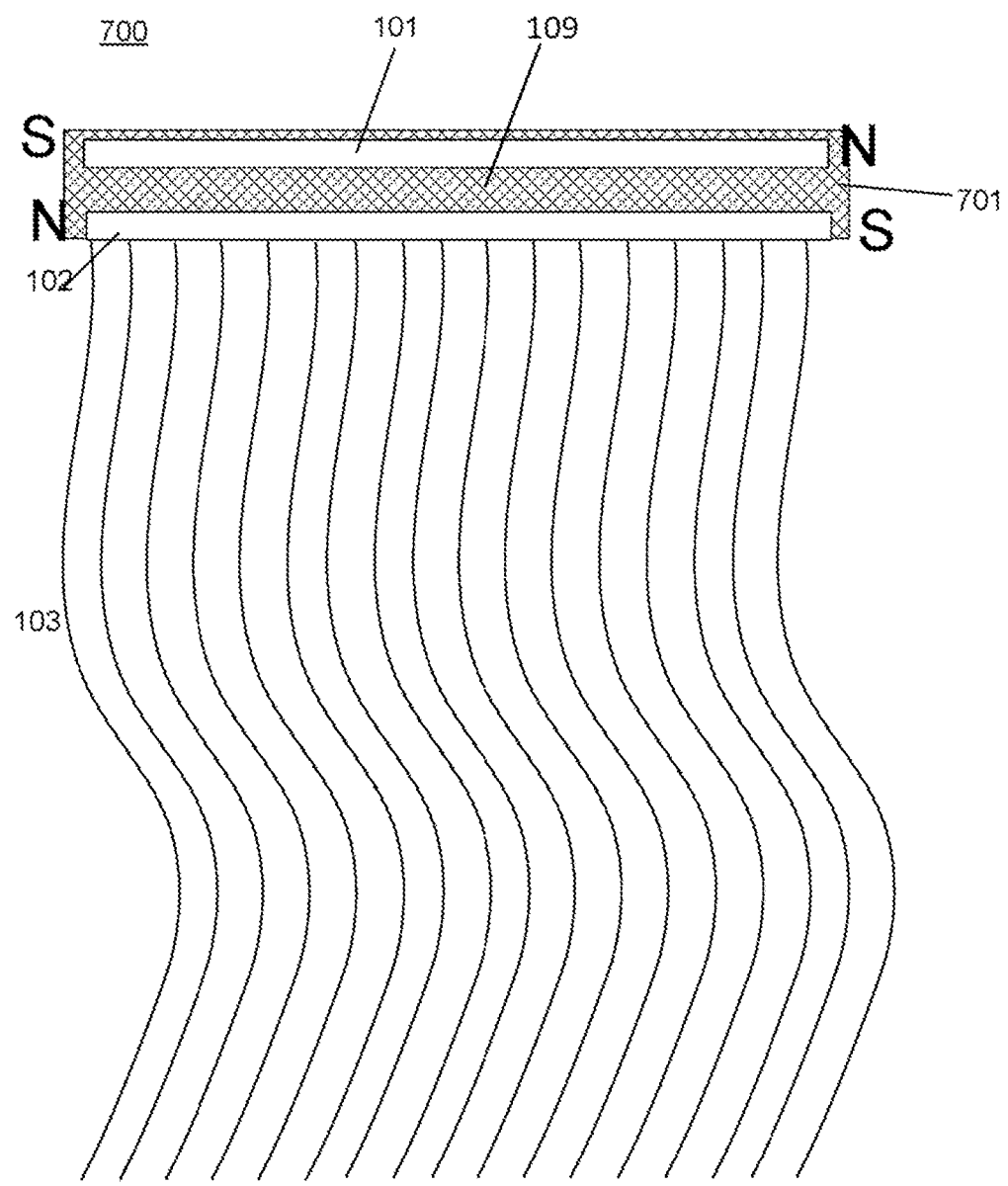
FIG. 7 illustrates an exemplary embodiment of a flexible magnetic securing device apparatus.

Referring now to FIG. 7, an exemplary embodiment of a flexible MSD apparatus 700 is shown. MSDs 101 and 102 are fixedly attached to a flexible substrate 701. While FIG. 7 only shows two MSDs, any even number of MSDs may be used. In some embodiments, the MSDs 101 and 102 are encased in the flexible substrate. The entirety of the flexible substrate 701 does not necessarily need to be flexible, but in exemplary embodiments, a middle portion of the flexible substrate 701 is flexible. This allows the flexible substrate to fold over on itself to allow the MSDs 101 and 102 to align. In some embodiments, MSDs 101 and 102 may self-align if placed in proximity to each other. Two MSDs 101 and 102 align according to polarities, such as N and S. In embodiments comprising multiple pairs of MSDs 101 and 102, pairs of magnets align in a series of N-S and S-N connections. In some embodiments, the magnetic connections hold the flexible substrate in position relative to each other. In some embodiments, natural hair placed between the magnetic connections additionally holds the substrate in position relative to a user's scalp and natural hair.

In exemplary embodiments, integrated hair 103 is fixedly attached to the substrate in an area corresponding to one or more of each magnet; each pair of magnets; an area of the substrate not necessarily associated with a magnet, but held in place by the connected magnets being removably affixed to the user's natural hair. Paired magnets may allow for a double layer of hair, which creates a thicker presentation to the world. Multiple pairs of magnets and extension hair allow for a "strip" of hair extensions. When properly spaced, these can allow for a predetermined "pattern" or "cut" to be effectuated on the user's head. By way of non-limiting example, these patterns can include one or more of: a layered hair look, a "bob," stacked, curls, asymmetric cuts, feathered, dreadlocks, shag, ringlets, tapered, free flowing hair with strategically place braids, position shading, colors, or special features, such as beads, feathers, and bows.

In some embodiments, the user can place the substrate 701 under natural hair to conceal the presence of the substrate 701 and allow the integrated hair 103 to flow from a seemingly natural source position. Additionally, in some embodiments, the substrate may be sprayed with colorant. In some embodiments, the color matches the hair; in other embodiments, the color may present a sharp contrast with the natural hair color. The substrate 701 may be sprayed at any point during the process of applying the substrate 701 to the user's hair, such as without limitation, prior to the substrate 701 being cut into the pattern, prior to being sewn into shape, or prior to the hair being sewn on (or otherwise fixedly attached to the substrate).

The flexible MSD apparatus 700 can be sold in a variety of coordinated sets and packages. For example, the MSD apparatus 700 sets can be coordinated according to one or more of: a color scheme (i.e., match hair and substrate color), hair style, or the size of the subject. Additionally, in some embodiments, the MSD apparatus 700 can further comprise a miniature "suit carrier"-style zip-up packaging. In other embodiments, the MSD apparatus 700 can further comprise a clasping hanger, such as that normally associated with hanging pants. In some embodiments, the MSD apparatus 700 may include condition for storage of hair extensions and substrate to preserve hair and color.

In some embodiments, the substrate 701 may comprise one or more magnetic components, such that a magnetic decorative effect may be applied. A magnetic decorative effect may include one or more of: a flower, an animation, a symbol, a rainbow, or an animal.

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A method of single-handed insertion of a hair integration, the method comprising the steps of sequentially:
    providing a first hair integration comprising:
        a first substrate defined by a flexible material having a non-slip liner comprising a pliable material comprising one of silicon, nylon, and polyvinylchloride and a first metallic magnetic portion functional as a first magnetic securing device;
        a second substrate consisting of a flexible material and a second metallic magnetic portion functional as a second magnetic securing device; and
        a flexible hinge material connecting the first substrate to the second substrate, where the hair integration further comprises integrated hair extending from either the first or the second substrate;
    with a single hand, inserting the first hair integration by placing the first substrate proximate to a scalp of the user;
    placing a first portion of natural hair of the user on the non-slip liner between the first magnetic securing device and the second magnetic securing device;
    with the same single hand, folding the flexible hinge material over the first portion of natural hair of the user;
    aligning the first magnetic securing device with the second magnetic securing device by aligning a North polarity portion of the first magnetic securing device with a South polarity portion of the second magnetic securing device; and
    magnetically binding the North polarity portion of the first magnetic securing device to the South polarity portion of the second magnetic securing device thereby securing at least a portion of the first portion of natural hair of the user between the first magnetic securing device and the second magnetic securing device;
    the method further comprising flexing the first substrate and the second substrate to compliment a shape of a skull structure of the user proximate the first hair integration.

2. The method of claim 1, wherein the first substrate and the second substrate include hair extensions of different thicknesses.

3. The method of claim 1, wherein the steps of: folding the flexible hinge material over the first portion of natural hair of the user; and
    via the folding of the flexible hinge material, aligning the North polarity portion of the first magnetic securing device with the South polarity portion of the second magnetic securing device are additionally conducted with the single hand.

4. The method of claim 1, wherein the step of folding the flexible hinge material over the first portion of natural hair of the user further comprises aligning a North polarity portion of a third magnetic securing device with a South polarity portion of a fourth magnetic securing device; and
    allowing the North polarity portion of the third magnetic securing device to be bound via magnetic attraction with the South polarity portion of the fourth magnetic securing device thereby attaching a second hair integration between the third magnetic securing device and fourth magnetic securing devices.

5. The method of claim 4, wherein the second hair integration comprises a different thickness than the first hair integration.

6. The method of claim 4, wherein the second hair integration forms a portion of a predefined hairstyle comprising at least one of: a bob, stacked, curls, and braids, wherein the method further comprises the step of concealing a presence of the first substrate under natural hair of the user, other than the first portion of natural hair of the user.

7. The method of claim 4, wherein the method further comprises the step of: spraying one or more of: the first and second hair integration with a colorant.

8. The method of claim 7, wherein the first hair integration and second hair integration are sprayed with colorants corresponding to different colors.

9. The method of claim 1 additionally comprising the step of flexing the first substrate with pressure against a portion of a head of the user and returning the first substrate to the first substrate's pre-flexed state upon removal of the pressure.

10. The method of claim 1, further comprising the steps of:
removing the North polarity portion of the first magnetic securing device from magnetic proximity of the South polarity portion of the second magnetic securing device thereby unbinding the user's natural hair from the first magnetic securing device and the second magnetic securing device and leaving only the first substrate and the second substrate and the first hair integration and second hair integration.

11. The method of claim 1, wherein one or both of the first substrate and the second substrate comprises a layer comprising a decorative portion comprising at least one of: a flower, an animation, a symbol, a rainbow, or an animal.

12. A single handed secured hair extension comprising:
a first flexible substrate comprising a size of about 20 mm long by 3 mm wide by 1 mm thick and flexible to compliment a shape of a skull structure of a user the first flexible substrate fixedly attached to a first magnetic securing device;
one or more hair integrations fixedly attached to the first flexible substrate;
a second substrate shaped to nest within the first flexible substrate consisting of a flexible material and a second magnetic securing device;
a hinge material connecting the first flexible substrate to the second substrate, the hinge material is foldable with a single hand over a portion of hair growing from the user's scalp;
the first magnetic securing device comprising multiple magnets smaller than the first magnetic securing device and including a North polarity portion attached to the first flexible substrate; and
the second magnetic securing device comprising multiple magnets smaller than the second magnetic securing device and including a South polarity portion attached to the second substrate and positionable to allow the North polarity portion of the first magnetic securing device to align with the South polarity portion of the second magnetic securing device while the flexible hinge material is folded with the single hand over the portion of the user's hair growing from the user's scalp binding the North polarity portion to the South polarity portion via magnetic attraction.

13. The secured hair extension of claim 12, additionally comprising a non-slip liner attached to the first flexible substrate.

14. The secured hair extension of claim 12, wherein the first flexible substrate and second substrate comprise one of: silicon, nylon and polychloride.

15. The secured hair extension of claim 12, wherein the first flexible substrate retains a shape once formed.

16. The secured hair extension of claim 12, wherein the first flexible substrate is flexible with pressure and returns to an original shape when the pressure is removed.

17. The secured hair extension of claim 12, wherein the secured hair extension comprises more than one colorized hair extension, and wherein the more than one colorized hair extensions comprise different thicknesses.

* * * * *